(12) United States Patent
Hirato et al.

(10) Patent No.: US 10,732,462 B2
(45) Date of Patent: Aug. 4, 2020

(54) DISPLAY DEVICE, AND METHOD OF PRODUCING DISPLAY DEVICE

(71) Applicant: SHARP KABUSHIKI KAISHA, Sakai, Osaka (JP)

(72) Inventors: Shinichi Hirato, Sakai (JP); Shohgo Kamada, Sakai (JP); Shuji Watanabe, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/380,606

(22) Filed: Apr. 10, 2019

(65) Prior Publication Data

US 2019/0317368 A1 Oct. 17, 2019

(30) Foreign Application Priority Data

Apr. 13, 2018 (JP) ................................. 2018-077777

(51) Int. Cl.
*G02F 1/1337* (2006.01)
*G02F 1/1339* (2006.01)

(52) U.S. Cl.
CPC ...... *G02F 1/133707* (2013.01); *G02F 1/1339* (2013.01); *G02F 1/133723* (2013.01); *G02F 2001/133776* (2013.01); *G02F 2201/123* (2013.01)

(58) Field of Classification Search
CPC ............. G02F 1/133707; G02F 1/1339; G02F 2201/123; G02F 1/133723; G02F 2001/133776
See application file for complete search history.

(56) References Cited

U.S. PATENT DOCUMENTS

| | | | |
|---|---|---|---|
| 9,383,622 B2* | 7/2016 | Kobashi | G02F 1/167 |
| 2007/0153214 A1* | 7/2007 | Park | G02F 1/13394 349/155 |
| 2015/0062515 A1* | 3/2015 | Tomioka | G02F 1/133788 349/123 |

FOREIGN PATENT DOCUMENTS

JP 2007-263998 A 10/2007

* cited by examiner

*Primary Examiner* — Hoan C Nguyen
(74) *Attorney, Agent, or Firm* — ScienBiziP, P.C.

(57) ABSTRACT

A pattern of ink applied to a display region is stabilized, and unevenness in thickness of the ink in the display region is reduced. A substrate has a hole which causes ink to be drawn into the hole, the hole has a third taper which is formed in a stepwise shape having a plurality of steps and which extends in a direction perpendicular to a direction in which the ink flows into the hole, and an angle of a tangential line connecting respective vertices of the plurality of steps of the third taper is shallower than (i) an angle of a first taper which is located on a side of the hole on which side the ink flows into the hole and (ii) an angle of a second taper which is located on a side of the hole on which side the ink is pushed out from the hole.

13 Claims, 15 Drawing Sheets

FIG. 8A
STEP1
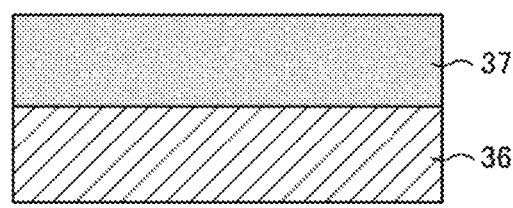
FIG. 8B
STEP2
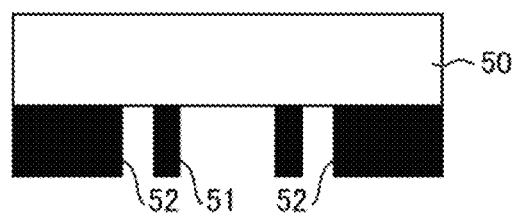
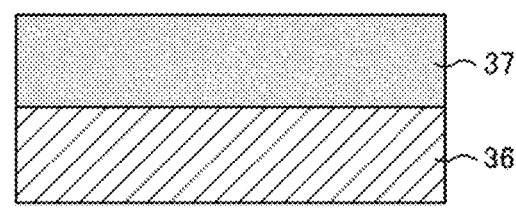
FIG. 8C
STEP3
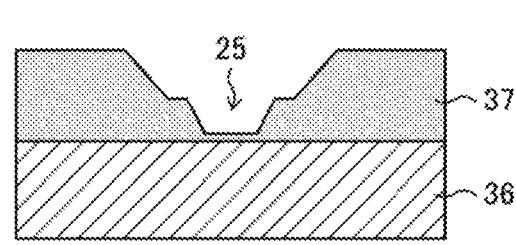

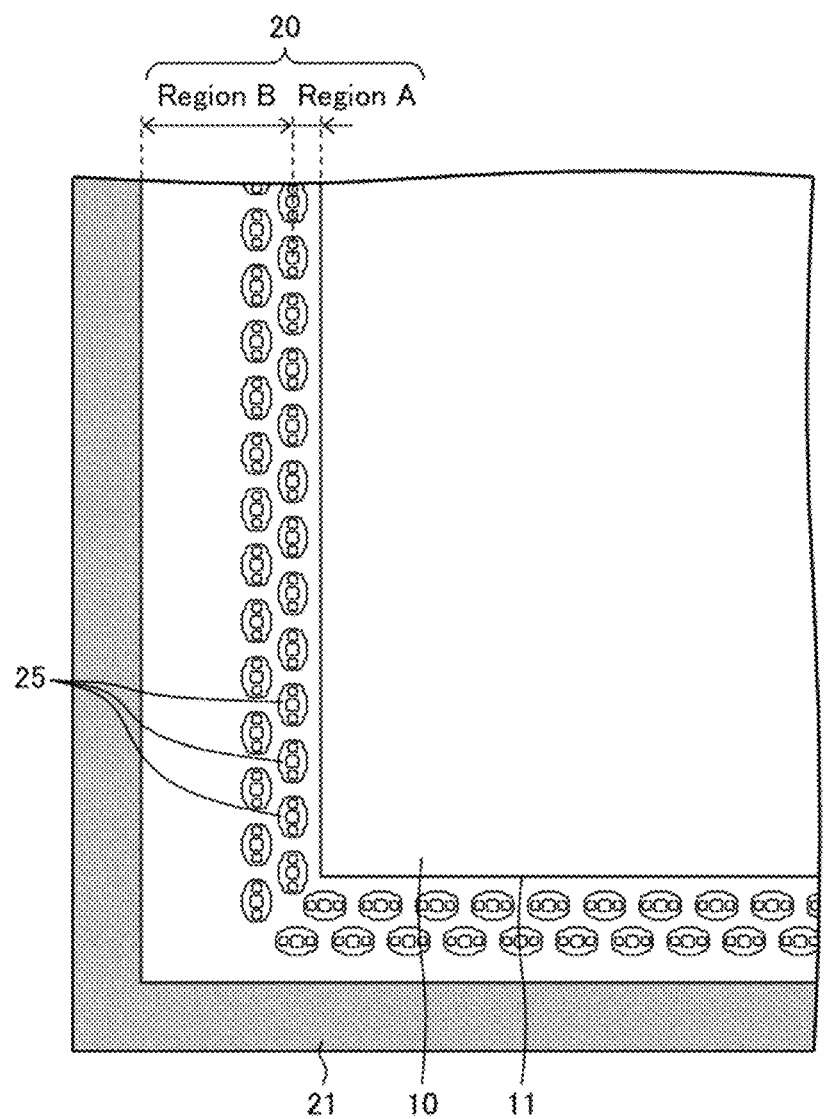

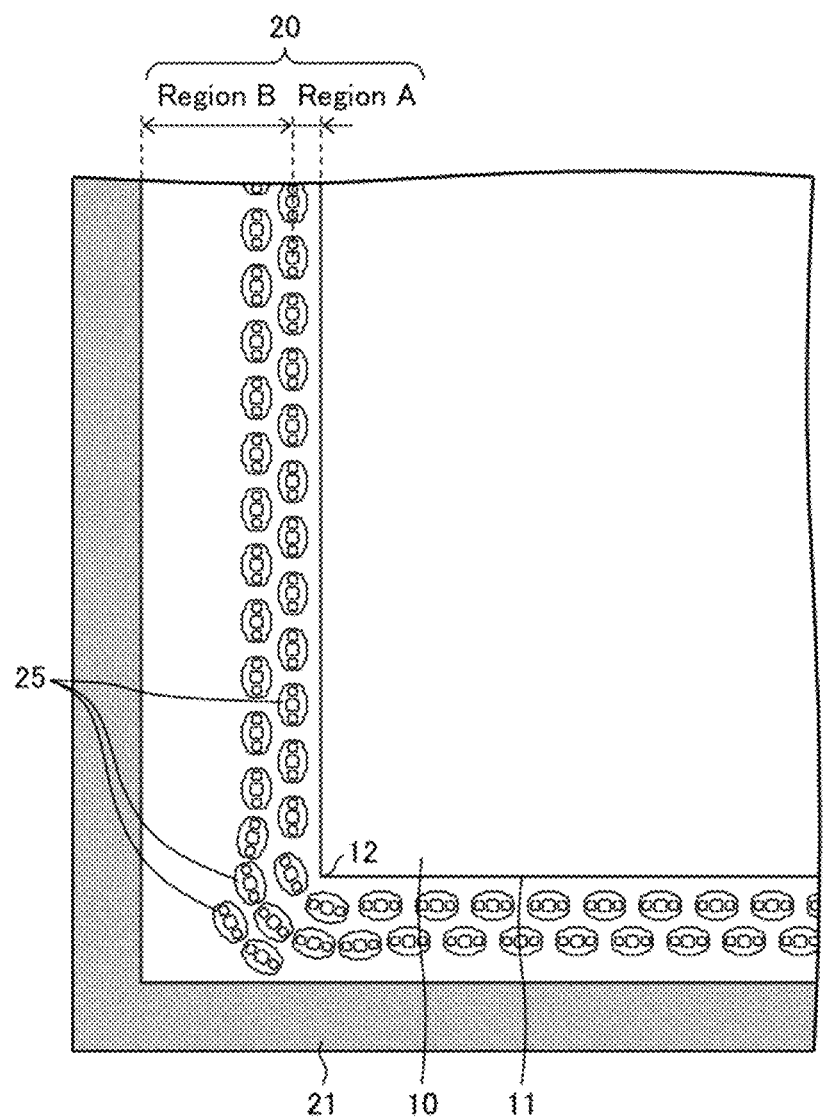

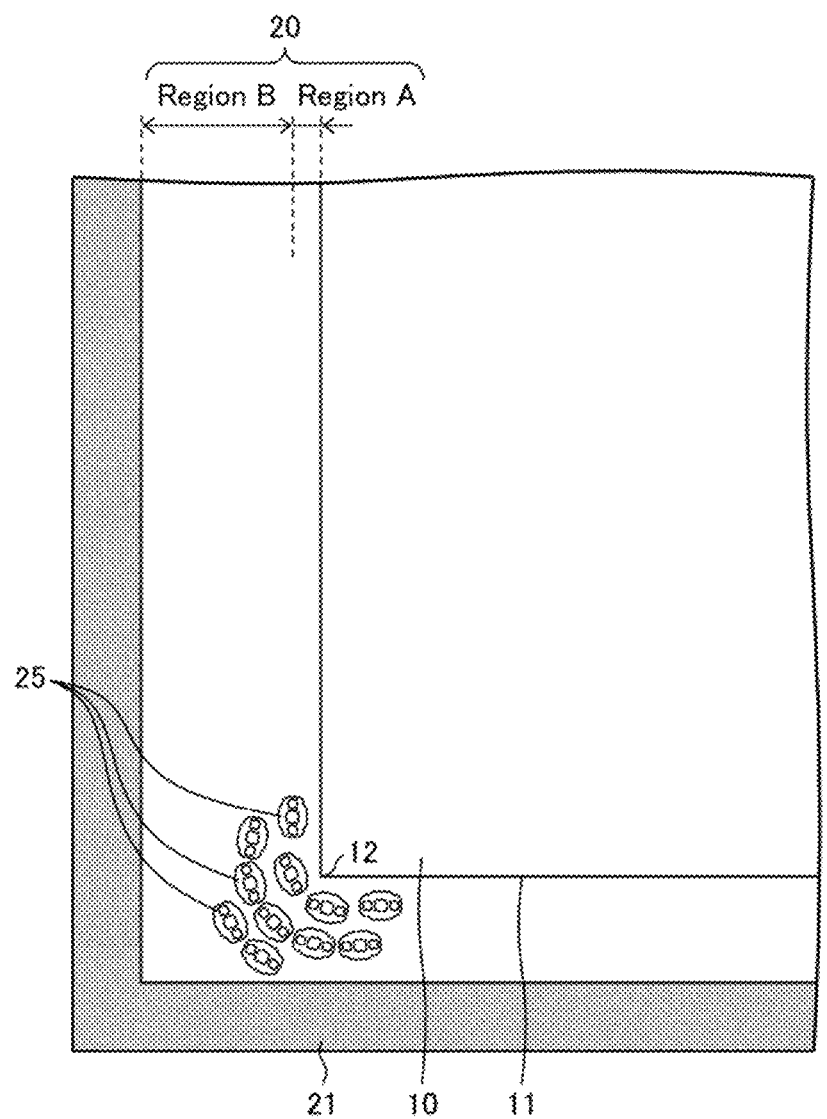

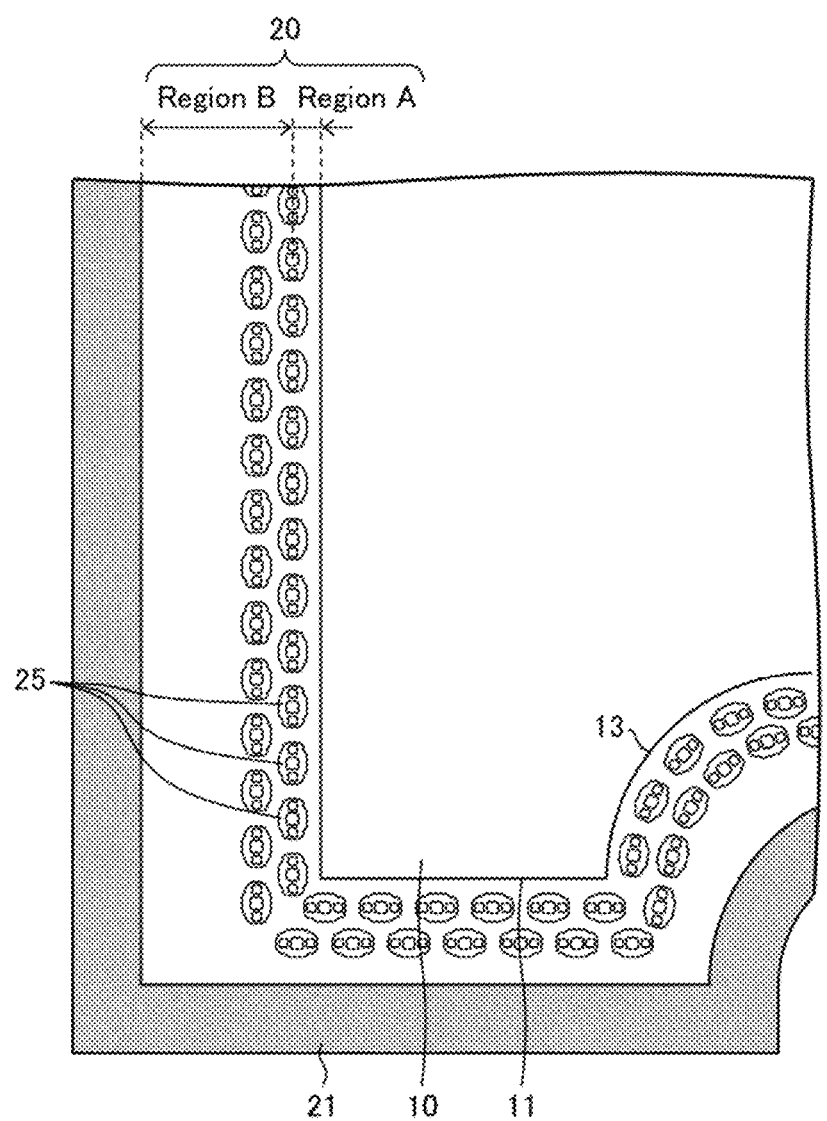

STEP1

STEP2

STEP3

STEP4

STEP5

STEP6

DISPLAY DEVICE, AND METHOD OF PRODUCING DISPLAY DEVICE

This Nonprovisional application claims priority under 35 U.S.C. § 119 on Patent Application No. 2018-077777 filed in Japan on Apr. 13, 2018, the entire contents of which are hereby incorporated by reference.

TECHNICAL FIELD

The present invention relates to a display device and a method of producing a display device.

BACKGROUND ART

Conventionally, liquid crystal display devices have been known in each of which a liquid crystal layer is sandwiched between a pair of substrates. According to those liquid crystal display devices, the liquid crystal layer is held such that the liquid crystal layer is sandwiched between alignment films which are formed on respective inner surfaces of the pair of substrates by a printing method or an ink jet method. Such an alignment film may have an uneven thickness at an edge of a pattern formed by ink. This uneven thickness of the alignment film may cause a deterioration in display quality.

Under the circumstances, a display device has been known in which a plurality of fine rectangular grooves are arranged in a region adjacent to a drive region of the display device so that a property of guiding an alignment film material is ensured and a difference, in state of arrangement of the alignment film material, between the drive region and such an adjacent region is reduced (see, for example, Patent Literature 1).

CITATION LIST

Patent Literature

[Patent Literature 1] Japanese Patent Application Publication, Tokukai No. 2007-263998 (published on Oct. 11, 2007)

SUMMARY OF INVENTION

Technical Problem

However, according to the foregoing conventional technique, it has been difficult to draw a rise of ink at a printed edge located at an end of a pixel, and unevenness in film thickness has been likely to occur. Consequently, there has been a display defect.

An object of an aspect of the present invention is to realize a technique for stabilizing a pattern of ink, applied to a display region, so as to reduce unevenness in thickness of the ink in the display region.

Solution to Problem

In order to attain the above object, a display device in accordance with an aspect of the present invention is a display device which is obtained by applying ink to a display region of a substrate, the substrate including at least one hole which causes the ink to be drawn into the at least one hole, the at least one hole having a third taper which is formed in a stepwise shape having a plurality of steps and which extends in a direction perpendicular to a direction in which the ink flows into the at least one hole, an angle of a tangential line connecting respective vertices of the plurality of steps of the third taper being shallower than (i) an angle of a first taper which is located on a side of the at least one hole on which side the ink flows into the at least one hole and (ii) an angle of a second taper which is located on a side of the at least one hole on which side the ink is pushed out from the at least one hole.

In order to attain the above object, a method of producing a display device in accordance with an aspect of the present invention is a method of producing a display device which is obtained by applying ink to a display region of a substrate, the method including: an insulating film forming step of forming a transparent interlayer insulating film on the substrate; and a hole forming step of forming a hole, which causes the ink to be drawn into the hole, by exposing, with use of a mask for exposure, the transparent interlayer insulating film formed in the insulating film forming step and developing the transparent interlayer insulating film thus exposed, in the hole forming step, a third taper, which extends in a direction perpendicular to a direction in which the ink flows into the hole, being formed into a stepwise shape having a plurality of steps, and an angle of a tangential line connecting respective vertices of the plurality of steps of the third taper being made shallower than (i) an angle of a first taper which is located on a side of the hole on which side the ink flows into the hole and (ii) an angle of a second taper which is located on a side of the hole on which side the ink is pushed out from the hole.

Advantageous Effects of Invention

According to an aspect of the present invention, it is possible to stabilize a pattern of ink applied to a display region, and accordingly possible to reduce unevenness in thickness of the ink in the display region.

BRIEF DESCRIPTION OF DRAWINGS

FIG. 8A is a view illustrating a respective step for forming the hole.

FIG. 8B is a view illustrating a respective step for forming the hole.

FIG. 8C is a view illustrating a respective step for forming the hole.

FIG. 9 is a view illustrating arrangement of holes in Variation 1.

FIG. 10 is a view illustrating arrangement of holes in Variation 2.

FIG. 11 is a view illustrating arrangement of holes in Variation 3.

FIG. 12 is a view illustrating arrangement of holes in Variation 4.

DESCRIPTION OF EMBODIMENTS

The following description will discuss, as an example, a display device 1 that is a liquid crystal display device in which a liquid crystal layer is sandwiched between a pair of substrates. Note, however, that the display device 1 is not limited to a liquid crystal display device. The display device 1 in accordance with the embodiments below can be alternatively, for example, an organic EL display which includes OLEDs (Organic Light Emitting Diodes) as electro-optical elements, an inorganic EL display which includes inorganic light emitting diodes as electro-optical elements, a QLED display which includes QLEDs (Quantum dot Light Emitting Diodes) as electro-optical elements, or the like.

Embodiment 1

The following description will discuss Embodiment 1 of the present invention in detail.

Figure 1:
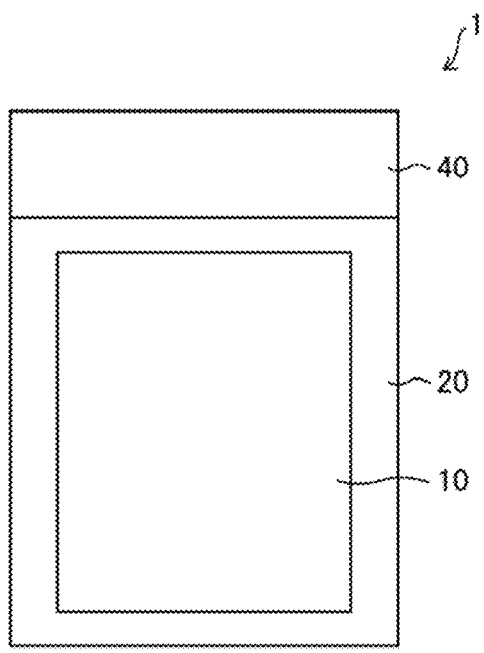
FIG. 1 is a plan view schematically illustrating an outline of a configuration of a display device in accordance with Embodiment 1.

FIG. 1 is a plan view schematically illustrating an outline of a configuration of a display device 1. The display device 1 includes a liquid crystal display panel (not illustrated), a driving circuit (not illustrated) which drives the liquid crystal display panel, and an illumination device (not illustrated) which emits light toward the liquid crystal display panel. The display device 1 displays an image in a display region 10.

In the liquid crystal display panel, a liquid crystal layer, which serves as a medium layer for display, is sandwiched between a pair of substrates 2, which are provided so as to face each other. According to the display device 1, one (array substrate) of the pair of substrates 2 is a TFT substrate to which TFTs (thin film transistors) are provided. The TFT substrate is configured such that (i) an insulating layer is provided on a glass substrate, (ii) a common electrode and pixel electrodes are provided on the insulating layer, and (iii) an alignment film is provided so that those electrodes are covered with the alignment film. The other one (color filter substrate) of the pair of substrates 2 of the display device 1 is configured such that a color filter, a dielectric layer, and an alignment film are provided in order on a glass substrate.

Each of those alignment films is formed by applying an alignment film material to a corresponding one of the pair of substrates 2 by a printing method, an ink jet method, or the like so that the each of the alignment films has a desired film thickness. The pair of substrates 2 to which the respective alignment films are thus formed are attached to each other with use of a sealing agent in a state where a desired gap is held therebetween with use of a spacer. The liquid crystal display panel is formed by sealing, in the gap between the pair of substrates 2, a medium containing a liquid crystal material.

In a case where (i) the display device 1 is a display device which is obtained by applying ink to the display region 10 of each of the pair of substrates 2 and (ii) the display device 1 is, for example, a QLED display, ink containing quantum dots is applied to the display region 10 by a printing method, an ink jet method, or the like.

(Configuration of Display Device 1)

As illustrated in FIG. 1, the display device 1 includes the display region 10, a frame region 20, and a terminal region 40. The display region 10 is a region in which an image is displayed and in which a plurality of pixels are arranged in a matrix manner. The frame region 20 is a region which surrounds the display region 10 and which includes a seal part 21 (see FIG. 2) to which a sealing agent is applied so that the pair of substrates 2 are attached to each other. In the terminal region 40, a terminal is patterned with use of a metal thin film, and an FPC (Flexible Printed Circuit) is pressure-bonded.

Figure 2:
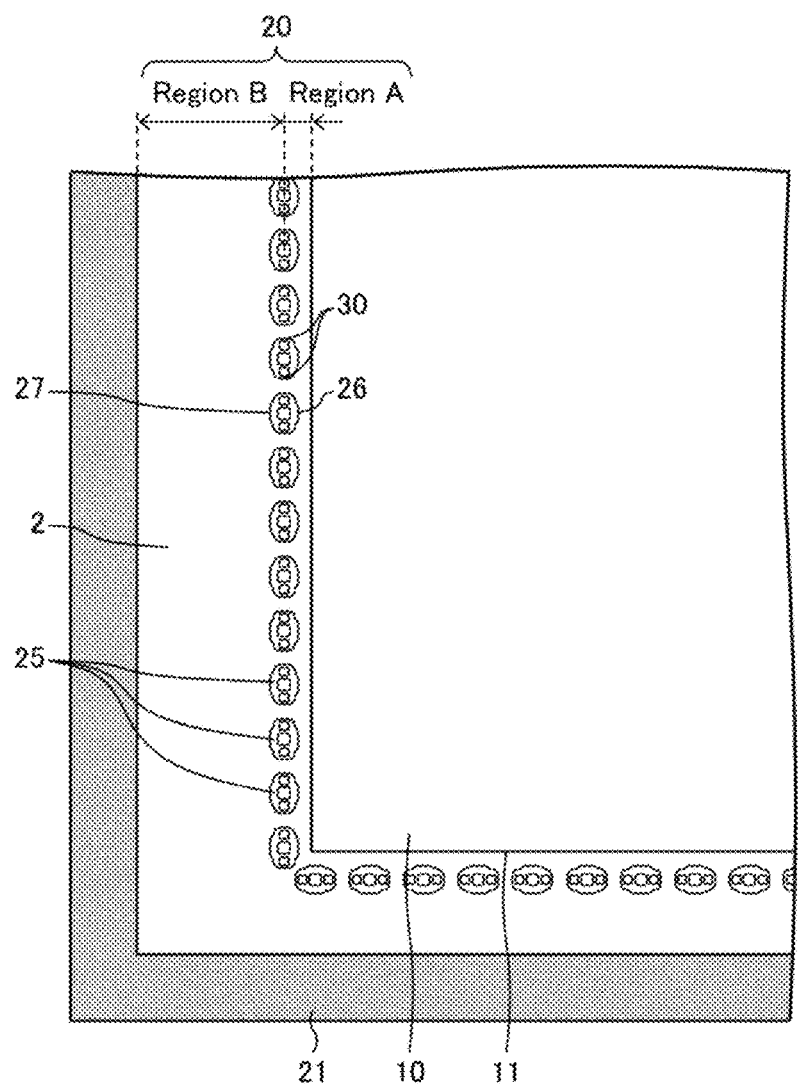
FIG. 2 is an enlarged view of part of a substrate.

FIG. 2 is an enlarged view of part of a substrate 2. By the way, each of the alignment films has a given film thickness. Therefore, it is necessary to separate the seal part 21 of the frame region 20 from an edge 11 of a pattern in the display region 10 by a given distance (for example, not less than 0.3 mm).

(Configuration of Hole 25)

As illustrated in FIG. 2, the substrate 2 has holes 25 which are provided in a region A that extends from the edge 11 of the pattern in the display region 10 to a location at a given distance from the edge 11 of the pattern. The region A is a region which extends from the edge 11 of the pattern in the display region to the center of each of the holes 25. The holes 25 are each a structure for drawing the ink applied to the display region 10. Note that a configuration of each of the holes 25 will be described later in detail. By thus providing the substrate 2 with the holes 25 for drawing the ink applied to the display region 10, it is possible to prevent a region, in which a film thickness of the ink is uneven, from being formed in the display region 10.

Further, in a case where adhesion between the alignment film and the sealing agent is poor, it is necessary to adjust an amount by which the seal part 21 of the frame region 20 overlaps the alignment film. As such, it is desirable to control a location to which the ink is applied or an amount of the ink applied so that a region in which the ink is applied extends to a location at a distance of at least 0.2 mm to 0.5 mm from an outermost periphery of the seal part 21 (region B). The region B is a region which extends from the innermost periphery of the seal part 21 to the center of each of the holes 25.

Note that the region. A can be minimized by bringing the holes 25 closer to the edge 11 of the pattern in the display region 10 so that an edge of each of the holes 25 is in contact with the edge 11. This makes it possible to draw, to the holes 25, the ink applied to the display region 10, and also makes it possible to push the ink out from the holes 25 and guide the ink to the region B. Thus, it is possible to prevent a region, in which the film thickness of the ink is uneven, from being formed in the display region 10.

The holes 25 are arranged in a single row around the display region 10. Adjacent ones of the holes 25 can be arranged so as to be close to each other but not to overlap each other. Alternatively, the adjacent ones of the holes 25 can be arranged so as to have therebetween a pitch substantially equivalent to a longer side L1 of each of the holes 25. Note that, even in a case where the adjacent ones of the holes 25 slightly overlap each other, it is possible to appropriately draw the ink applied to the display region 10.

The holes 25 are arranged so that a direction of the longer side L1 of each of the holes 25 (a direction in which third tapers extend) is parallel to the edge 11 of the pattern of the ink. Note that such a configuration that the ink is drawn with use of the holes 25 is applicable to both of the array substrate and the color filter substrate, and is applicable, as appropriate, to patterning of a transparent interlayer insulating film, the alignment films, a UV curable overcoat, and/or the like.

Figure 3A:
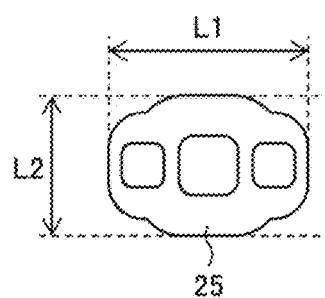
FIG. 3A is a plan view illustrating a configuration of a hole.
Figure 3B:
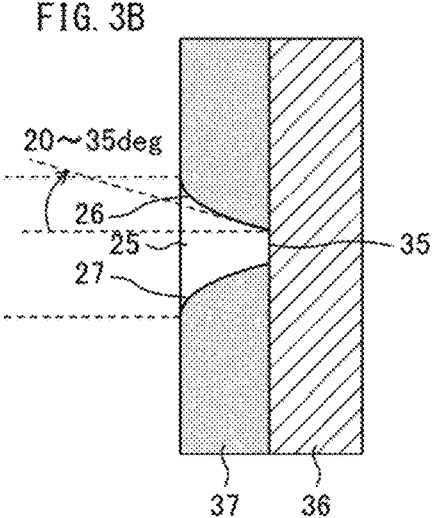
FIG. 3B is a cross-sectional view illustrating the configuration of the hole.
Figure 4A:
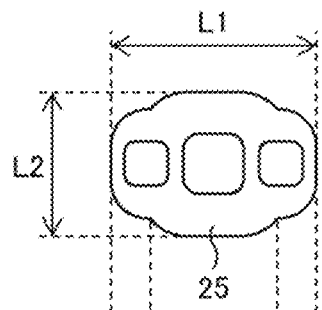
FIG. 4A is a plan view illustrating the configuration of the hole.
Figure 4B:
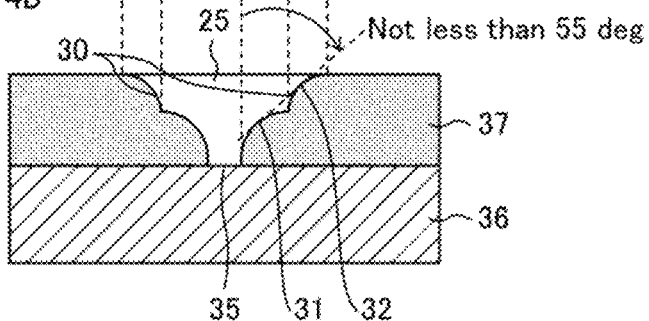
FIG. 4B is a cross-sectional view illustrating the configuration of the hole.

FIGS. 3 and 4 are each a view illustrating a configuration of a hole 25. FIG. 3A and FIG. 4A are each a plan view of the hole 25. FIG. 3B and FIG. 4B are each a cross-sectional view of the hole 25.

As illustrated in FIG. 3A, the hole 25 has sides longer than the other sides. According to Embodiment 1, the longer sides will be referred to as the longer side L1, and shorter sides will be referred to as a shorter side L2. FIG. 3B illustrates a cross section of the hole 25 which cross section is taken along a line which passes through the center of the hole 25 in a direction of the shorter side L2. As illustrated in FIG. 3B, the hole 25 is formed so that an angle of inclination (taper angle) of a first taper 26, which is one of tapers extending in the direction of the shorter side L2, is shallower than an angle of inclination (taper angle) of a second taper 27, which is the other one of the tapers extending in the direction of the shorter side L2. Note that the angle of inclination and the taper angle are each defined as indicating an angle made with a normal line.

The first taper 26 is arranged on a side of the hole 25 on which side the ink flows into the hole 25 from the edge 11 of the pattern in the display region 10, and the second taper 27 is arranged on a side of the hole 25 on which side the ink is pushed out from the hole 25.

The angle of inclination of the first taper 26 is 25 degrees to 35 degrees (50 degrees to 70 degrees in terms of the taper angle), and preferably 33 degrees.

FIG. 4B illustrates a cross section of the hole 25 which cross section is taken along a line which passes through the center of the hole 25 in the direction of the longer side L1.

As illustrated in FIG. 4B, in the hole 25, tapers extending in the direction of the longer side which is perpendicular to a direction in which the ink flows into the hole 25 from the edge 11 of the pattern of the display region 10, are both formed in a stepwise shape having a plurality of steps. Those tapers extending in the direction of the longer side L1 will be referred to as third tapers 30. Note that, in Embodiment 1, an example is described in which each of the third tapers 30 has two steps. However, the third tapers 30 are not limited to such an example, and each of the third tapers 30 can alternatively have three or more steps.

Each of the third tapers 30 only needs to be configured such that an angle (angle of inclination) of a tangential line connecting respective vertices of the plurality of steps is not less than 55 degrees, and preferably 63 degrees. In a case where each of the third tapers 30 has two steps, an angle of inclination of a lower step 31, which is the first step from a bottom part 35 of the hole 25, is preferably 35 degrees to 36 degrees (70 degrees to 72 degrees in terms of a taper angle), and an angle of inclination of an upper step 32, which is the second step from the bottom part 35, is preferably 55 degrees to 56 degrees (110 degrees to 112 degrees in terms of a taper angle).

As a maximum outer diameter of the hole 25 becomes smaller, it becomes possible to more easily draw the ink. For example, the hole 25 can have such a maximum outer diameter that the longer side L1 is 18 μm and the shorter side L2 is 14 μm. Further, in a case where the hole 25 is formed so that each of the third tapers 30 has two steps, an inner diameter at the vertex of the lower step 31, which is the first step from the bottom part 35, can be, for example, 10 μm in the direction of the longer side L1 and 6 μm in the direction of the shorter side L2. Note that the maximum outer diameter and the inner diameter of the hole 25 can be made smaller, provided that it is possible to maintain a relationship between (i) the angle of the tangential line connecting the respective vertices of the plurality of steps and (ii) an angle of inclination of each of the plurality of steps.

The hole 25 can be formed so that a film thickness of the lower step 31 and a film thickness of the upper step 32 are in a ratio of 50 to 50 or alternatively in a ratio of 30 to 70 or 70 to 30. The hole 25 is not limited by such a difference in film thickness.

Figure 5:
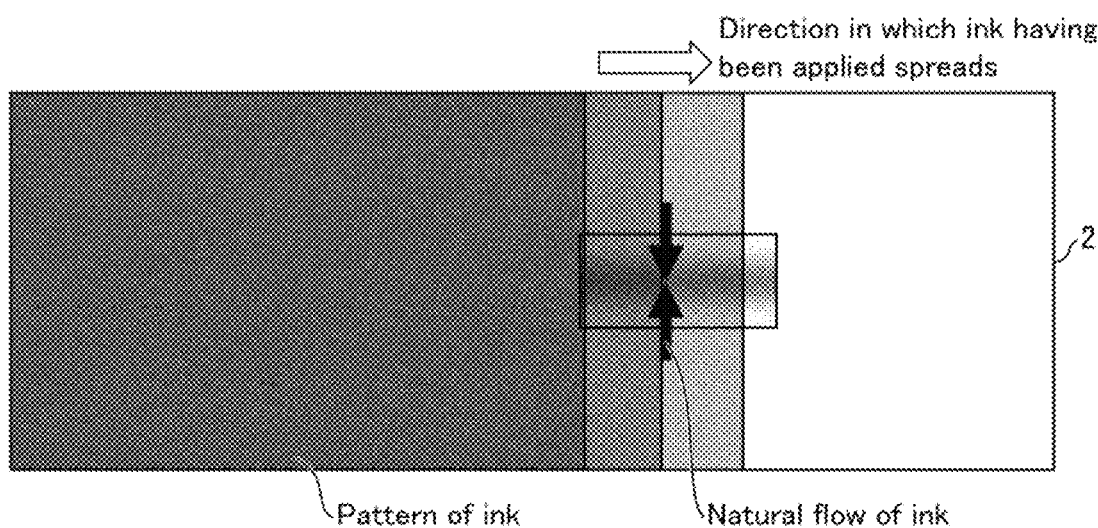
FIG. 5 is a view schematically illustrating a relationship between a shape of the hole and a direction in which ink flows into the hole.
Figure 6:
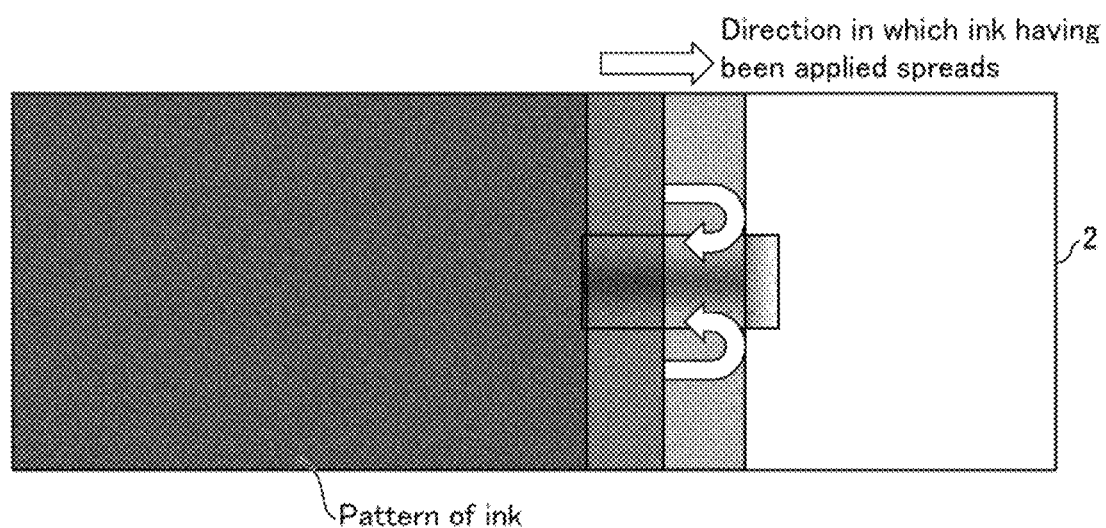
FIG. 6 is a view schematically illustrating the relationship between the shape of the hole and the direction in which the ink flows into the hole.

FIGS. 5 and 6 are each a view schematically illustrating a relationship between (i) a shape of the hole 25 and (ii) the direction in which the ink flows into the hole 25.

FIG. 5 illustrates a relationship between (i) a direction in which the ink having been applied spreads and (ii) the direction in which the ink flows into the hole 25, in a case where the hole 25 is formed so that (a) merely tapers which extend in a direction in which the ink is applied have strong inclination (steep inclination) and (b) tapers which extend in a direction perpendicular to the direction in which the ink is applied have slight inclination. As illustrated in FIG. 5, in a case where the tapers which extend in the direction perpendicular to the direction in which the ink is applied are caused to have slight inclination, surface tension of the ink is released by such slight inclination, so that force acts which causes the ink to be drawn in the direction perpendicular to the direction in which the ink is applied. This causes the ink to be drawn into the hole 25 along the slight inclination, and ultimately allows the pattern of the ink, applied to the display region 10, to be stabilized.

Meanwhile, FIG. 6 illustrates the relationship between (i) the direction in which the ink having been applied spreads and (ii) the direction in which the ink flows into the hole 25, in a case where the hole 25 is formed so that, out of the tapers which extend in the direction in which the ink is applied, inclination of a taper which is located on the side on which the ink flows into the hole 25 is slighter than inclination of a taper which is located on the side on which the ink is pushed out from the hole 25. As illustrated in FIG. 6, in a case where the taper which is located on the side on which the ink is pushed out from the hole 25 is caused to have stronger inclination, force, which causes the ink to enter the hole 25 while entangling the ink which is to be pushed out from the hole 25, acts on the side on which the ink is pushed out from the hole 25. This allows the ink to be efficiently drawn into the hole 25, and ultimately allows the pattern of the ink, applied to the display region 10, to be stabilized.

As illustrated in FIGS. 3 and 4, the hole 25 in accordance with Embodiment 1 is formed so that the angle of inclination of the first taper 26, which is located on the side on which the ink flows into the hole 25, is shallower than the angle of inclination of the second taper 27, which is located on the side on which the ink is pushed out from the hole 25. Furthermore, the hole 25 is formed so that an angle of inclination of each of the third tapers 30, which extend in the direction perpendicular to the direction in which the ink flows into the hole 25, is shallower than the angle of inclination of the first taper 26 and the angle of inclination of the second taper 27. This allows the ink to be efficiently drawn into the hole 25, and ultimately allows the pattern of the ink, applied to the display region 10, to be stabilized.

According to the above configurations, since the holes 25 are arranged around the display region 10, it is possible to efficiently guide, to the holes 25, rises of the ink which rises occur at respective ends of pixels that are located at the edge 11 of the display region 10. It is therefore possible to appropriately control a film thickness of, for example, a polyimide film which is provided on the pixels that are located on an outermost periphery of the display region 10, and possible to suitably apply the configurations to the display device 1 which is designed to have a narrow frame, because printing precision is improved.

(Process for Forming Hole 25)

Figure 7:
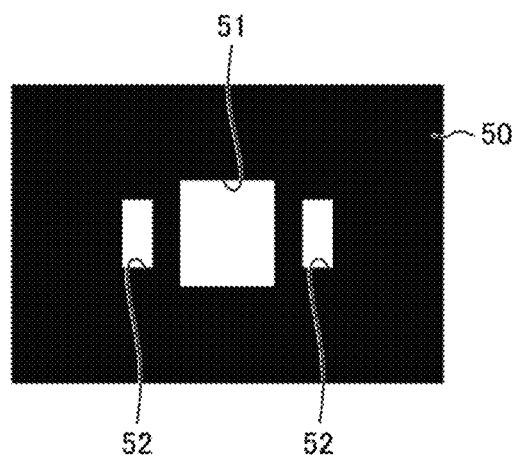
FIG. 7 is a plan view of a mask.

FIG. 7 is a view illustrating an example of a mask 50 used to form the hole 25. FIG. 8 is a view illustrating a process for forming the hole 25. FIG. 8A through FIG. 8C are views schematically illustrating respective steps for forming the hole 25.

As illustrated in FIG. 7, the mask 50 has an opening 51 which is located substantially at a middle part of the mask 50 and which has a size of 5 µm×5 µm and slits 52 which are located on respective both sides of the opening 51 having a larger diameter and each of which has a size of 1.5 µm×4.5 µm. The mask 50 is a so-called gray tone mask. Each of the opening 51 and the slits 52 has an exposure adjusting function.

As illustrated in FIG. 8A, in a case where the hole 25 is formed, an insulating film material (for example, positive organic material) is applied to a base material 36 of the substrate 2 with use of a slit coater, and a solvent is dried by carrying out vacuum drying and prebaking so that a transparent interlayer insulating film 37 is formed. The transparent interlayer insulating film 37 can be caused to have a film thickness of, for example, 3 µm. (STEP 1)

Note that a passivation layer (SiN or SiO) or a transparent electrode (ITO or IZO), each of which is not illustrated, can be provided as an uppermost layer of the hole 25. Note also that a base coat (SiN) or a source metal can be provided on the base material 36.

Next, as illustrated in FIG. 8B, the transparent interlayer insulating film 37 is irradiated with i-line (365 nm) having energy of approximately 190 mJ through the mask 50. This causes the transparent interlayer insulating film 37 to be exposed to the i-line in the form of the opening 51 and the slits 52. (STEP 2)

As illustrated in FIG. 8C, the transparent interlayer insulating film 37 which has been exposed is developed with use of an alkaline solution, for example, TMAH (tetramethylammonium hydroxide). After development, the transparent interlayer insulating film 37 is prebaked at 100° C. for 10 minutes, and is additionally heated at 220° C. for 40 minutes, so that the hole 25 is formed in the transparent interlayer insulating film 37. Note that, by heating after the development, the transparent interlayer insulating film 37 has a film thickness of, for example, 2.3 µm. (STEP 3)

As such, the process for producing the hole 25 which causes the ink to be drawn includes (i) an insulating film forming step of forming the transparent interlayer insulating film 37 on the substrate 2 and (ii) a hole forming step of forming the hole 25 by (a) exposing, with use of the mask 50 for exposure, the transparent interlayer insulating film 37 formed in the insulating film forming step and (b) developing the transparent interlayer insulating film 37 thus exposed. In the hole forming step, the third tapers 30 are formed by (i) exposing the transparent interlayer insulating film 37 once with use of the mask 50 for exposure which has the slits 52 each corresponding to the stepwise shape having the plurality of steps and (ii) developing the transparent interlayer insulating film 37 thus exposed.

Note that, although FIG. 8C illustrates the hole 25 by showing cross sections of the third tapers 30, the first taper 26 and the second taper 27 are each formed, key the STEPs 1 through 3, so as to have a steep taper shape. Note also that the hole 25 is not limited to such a configuration that the hole 25 is formed in the transparent interlayer insulating film 37, and can be alternatively formed in an overcoat for the color filter (not illustrated).

(Variation 1)

FIG. 9 is a view illustrating Variation 1 of arrangement of the holes 25. As illustrated in FIG. 9, the holes 25 can be arranged in a plurality of rows around the display region 10. In this case, adjacent rows of holes 25 are preferably arranged so as to be as close as possible to each other but not to overlap each other. Alternatively, distance between the centers of the adjacent rows of holes 25 can be set so as to be equal to the shorter side L2 of each of the holes 25. Further, the distance between the centers of the adjacent rows of holes 25 can be shortened by staggering the adjacent rows of holes 25.

Note that FIG. 9 illustrates an example in which the holes 25 are arranged in two rows around the display region 10, but the holes 25 are not limited to such arrangement. The holes 25 can be alternatively arranged in three or more rows around the display region 10.

(Variation 2)

FIG. 10 is a view illustrating Variation 2 of the arrangement of the holes 25. As illustrated in FIG. 10, the holes 25 are arranged in a plurality of rows around the display region 10. Furthermore, the holes 25 are arranged so that rows of holes 25 arranged around a corner 12 of the display region 10 are greater, in number, than rows of holes 25 arranged around the other part. The holes 25 which are arranged around the corner 12 of the display region 10 are preferably arranged radially with respect to a tip of the corner 12.

The ink applied to the display region 10 planarly and circularly spreads around the corner 12 of the display region 10. Therefore, by causing the holes 25 which are arranged around the corner 12 of the display region 10 to be arranged radially with respect to the tip of the corner 12, it is possible to efficiently draw the ink.

(Variation 3)

FIG. 11 is a view illustrating Variation 3 of the arrangement of the holes 25. As illustrated in FIG. 11, the holes 25 can be partially arranged around the corner 12 of the display region 10. The way the ink, applied to the display region 10, spreads around the corner 12 of the display region 10 is different from that around the other part. Therefore, the ink may locally flow around the corner 12.

By partially arranging the holes 25 around the corner 12 of the display region 10, the ink applied to the display region 10 is equally guided to the frame region 20 from the entire display region 10. This makes it possible to stabilize the pattern of the ink in the display region 10 and reduce unevenness in thickness of the ink.

(Variation 4)

FIG. 12 is a view illustrating Variation 4 of the arrangement of the holes 25. As illustrated in FIG. 12, the display region 10 may have a curved part 13 which is obtained by forming part of the edge 11 into a curved shape, not a linear shape, as viewed from above. The way the ink, applied to the display region 10, spreads around such a curved part 13 is different from that around the other part.

In a case where the holes 25 are arranged around the display region 10 which has the curved part 13, the holes 25 are arranged so that the holes 25 which are arranged around the curved part 13 extend along a curved edge 11 of the curved part 13. The holes 25 are preferably arranged so that the longer side L1 of each of the holes 25 which are arranged around the curved part 13 is parallel to the curved edge 11 of the curved part 13.

By thus arranging the holes 25 so that the longer side L1 of each of the holes 25 which are arranged around the curved part 13 is parallel to the curved edge 11 of the curved part 13, it is possible to draw the ink, applied to the display region 10, to the holes 25 along a shape of the display region 10, and possible to keep evenness in thickness of the ink in the display region 10.

The curved part 13 can be a notch for a fingerprint sensor or a camera which notch is formed in the display region 10, and the holes 25 can be suitably used to reduce unevenness in thickness of the ink in the notch.

Embodiment 2

The following description will discuss Embodiment 2 of the present invention. Note that, for convenience, an identical reference numeral will be given to a member having a function identical to that of a member described in Embodiment 1, and description of the member will be omitted.

Figure 13:
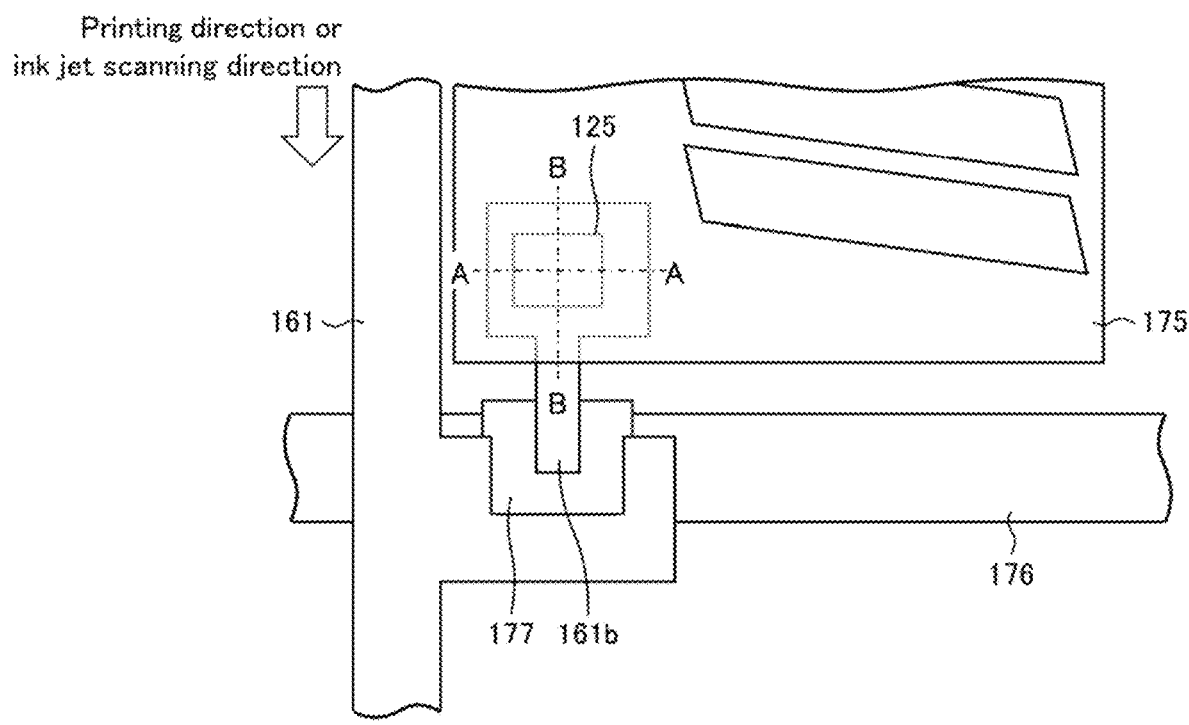
FIG. 13 is a plan view illustrating arrangement of a hole in accordance with Embodiment 2.
Figure 14:
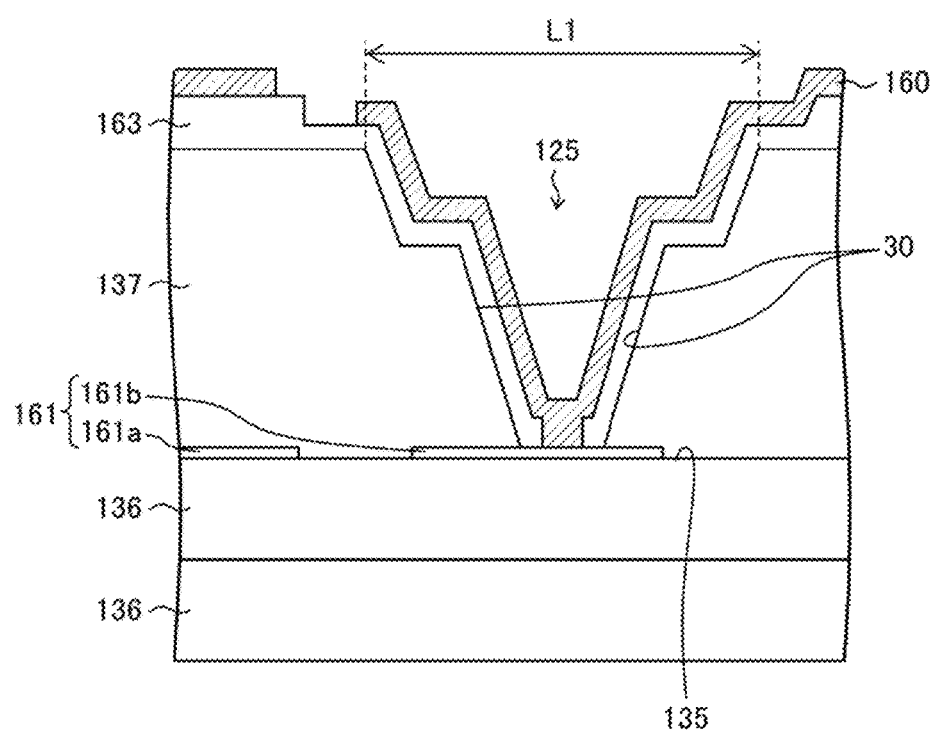
FIG. 14 is a cross-sectional view of the hole in accordance with Embodiment 2, taken along a line A-A illustrated in FIG. 13.
Figure 15:
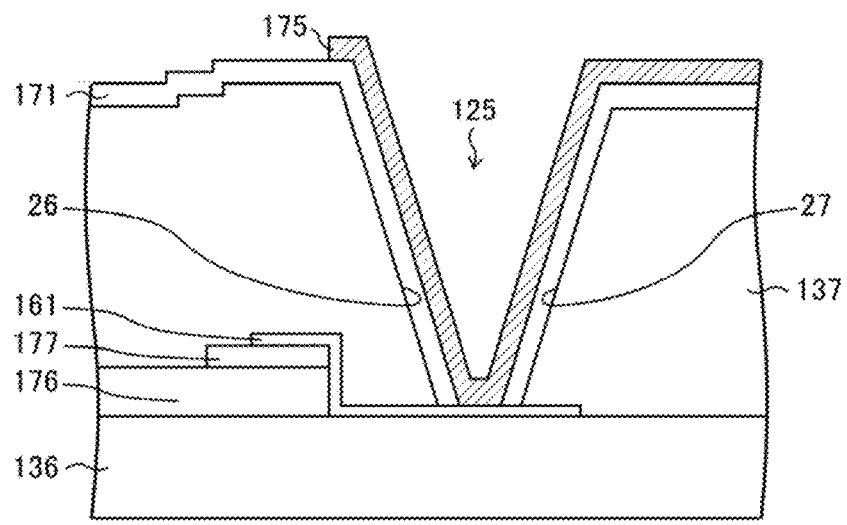
FIG. 15 is a cross-sectional view of the hole in accordance with Embodiment 2, taken along e B-B illustrated in FIG. 13.

In Embodiment 1 above, an example has been described in which holes 25 are arranged around a display region 10. In Embodiment 2, an example will be described in which holes 125, each having a configuration similar to that of each of the holes, are arranged in respective pixels in the display region 10. FIG. 13 is a plan view illustrating arrangement of a hole 125. FIGS. 14 and 15 are each a cross-sectional view illustrating a configuration of the hole 125. FIG. 14 is a cross-sectional view taken along a line A-A illustrated in FIG. 13. FIG. 15 is a cross-sectional view taken along a line B-B illustrated in FIG. 13.

As illustrated in FIG. 13, the hole 125 is a structure which is arranged in a pixel in the display region 10 so as to cause an electric current to flow to a pixel electrode 160. The hole 125 causes the pixel electrode 160 to be connected to a gate 176 via a source metal 161 and a semiconductor layer 177. The hole 125 is arranged so that a longer side L1 of the hole 125 is perpendicular to a printing direction or an ink jet scanning direction.

As illustrated in FIGS. 14 and 15, the hole 125 is formed in a transparent insulating film 137 which is formed on a base material to which a base coat 136 is applied. A passivation layer 171 can be provided on a surface of the base coat 136 and on a surface of the transparent insulating film 137. In the hole 125, the source metal 161 is arranged on a bottom part 135, and a pixel electrode 160 is arranged along third tapers 30, illustrated in FIG. 14, which extend in a direction of the longer side L1. The source metal 161 includes a source bus line electrode 161a and a drain electrode 161b.

In a case where ink applied to the display region 10 is not evenly drawn to the holes 125, unevenness in the form of a group of dots, called sesame unevenness (or sharkskin unevenness), occurs in the display region 10. By arranging the holes 125 so that the longer side L1 is perpendicular to and a shorter side L2 is parallel to the printing direction in which the ink is applied, it is possible to evenly guide the ink, applied to the display region 10, into the holes 125, and possible to prevent the sesame unevenness from occurring in the display region 10.

The hole 125 is applicable to any of a horizontal alignment film used as an IPS, a vertical alignment film used for VA, and an optical alignment film. Furthermore, the hole 125 can be suitably used also for an OLED display, as a structure for avoiding application unevenness in a case where an organic EL layer is formed in a display region 10 by a printing method or an ink jet method. By thus causing the ink, applied to the display region 10, to be guided to the hole 125, the hole 125 allows a reduction in unevenness in thickness of the ink in the display region 10, irrespective of a type of the ink (for example, liquid crystal alignment film ink, organic EL layer ink, and the like).

The hole 125 allows the ink to be more efficiently guided into the hole 125, as a maximum outer diameter of the hole 125 and a diameter of the bottom part 135 become smaller. Therefore, causing the maximum outer diameter of the hole 125 and the diameter of the bottom part 135 to be smaller is effective as a measure against the sesame unevenness. The hole 125 is preferably configured such that (i) the diameter of the bottom part 35 is not more than 5 μm and (ii) the maximum outer diameter is larger than the diameter of the bottom part 35 and is not more than 15 μm.

The hole 125 can have a surface serving as a taper which extends in a direction of the shorter side L2, which is parallel to the printing direction or the ink jet scanning direction, and which is located on a side on which printing is started in the printing direction or scanning is started in the ink jet scanning direction.

Furthermore, the hole 125 can have a surface serving as a taper which is located on a side on which the printing is ended in the printing direction or the scanning is ended in the ink jet scanning direction. Note, however, the taper which is located on the side on which the printing or the scanning is ended is preferably asymmetric to the taper which is located on the side on which the printing or the scanning is started. An angle of the taper of the hole 125 which taper is located on the side on which the printing or the scanning is started and an angle of the taper of the hole 125 which taper is located on the side on which the printing or the scanning is ended are each preferably approximately 30 degrees. The angle of the taper which is located on the side on which the printing or the scanning is started, that is, on the side on which the ink flows into the hole 125 is preferably shallower, by approximately 3 degrees, than the angle of the taper which is located on the side on which the printing or the scanning is ended, that is, on the side on which the ink is pushed out from the hole 125.

Figure 18:
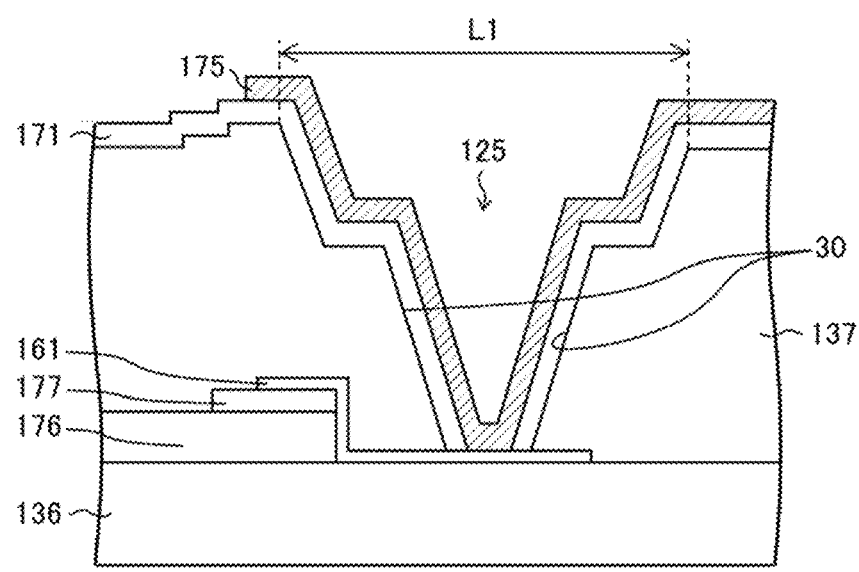
FIG. 18 is a cross-sectional view of the hole in accordance with the variation, taken along a line B-B illustrated in FIG. 16.

Such a difference in angle of inclination is made by stacking a lower-layer metal, which is provided on the bottom part 135 of the hole 125, on a first taper 26, which is located on the side on which the printing or the scanning is ended, or one of the third tapers 30 which one is located on the side on which the printing or the scanning is ended (see FIG. 15 or 18).

The lower-layer metal can be caused to have a film thickness of, for example, 400 nm. Note, here, that the lower-layer metal indicates a metal pattern which is formed simultaneously with a gate bus line (gate 176) or a source bus line (source metal 161).

By thus arranging the hole 125 in the pixel in the display region 10 so that the longer side L1 of the hole 125 is perpendicular to the printing direction in which the ink is applied, it is possible to evenly draw the ink, applied to the display region 10, into the hole 125, and possible to prevent the sesame unevenness from occurring in the display region 10.

Figure 16:
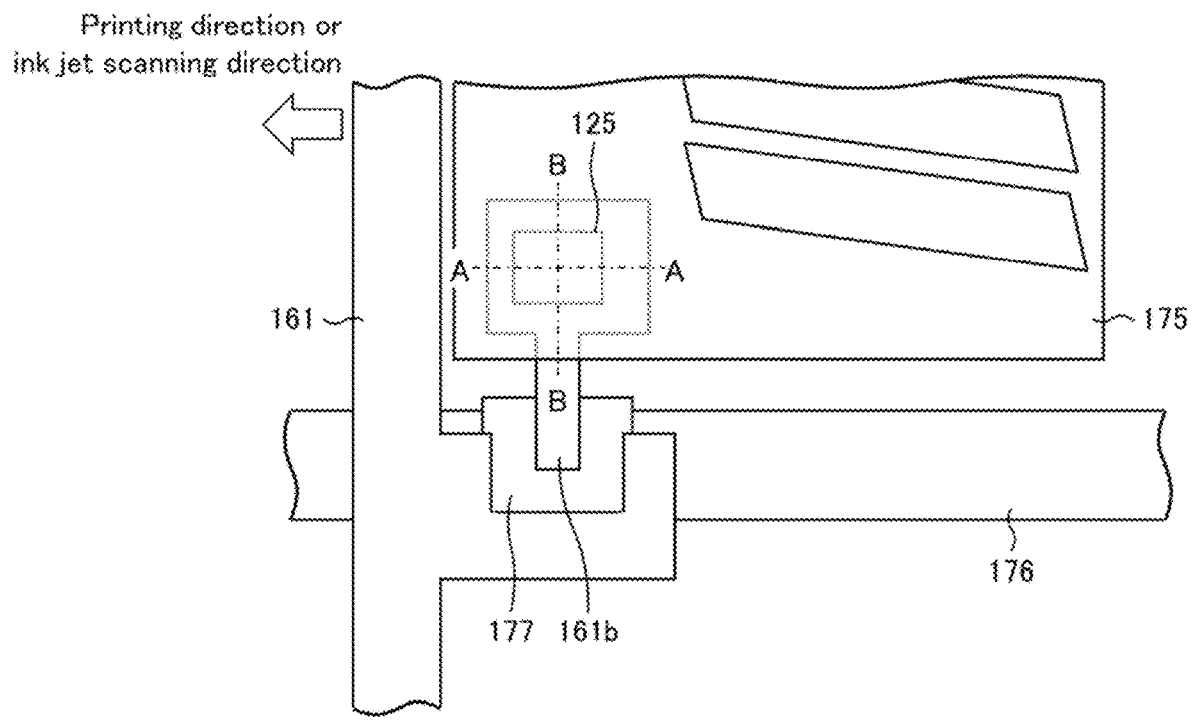
FIG. 16 is a plan view illustrating arrangement of a hole in accordance with a variation.
Figure 17:
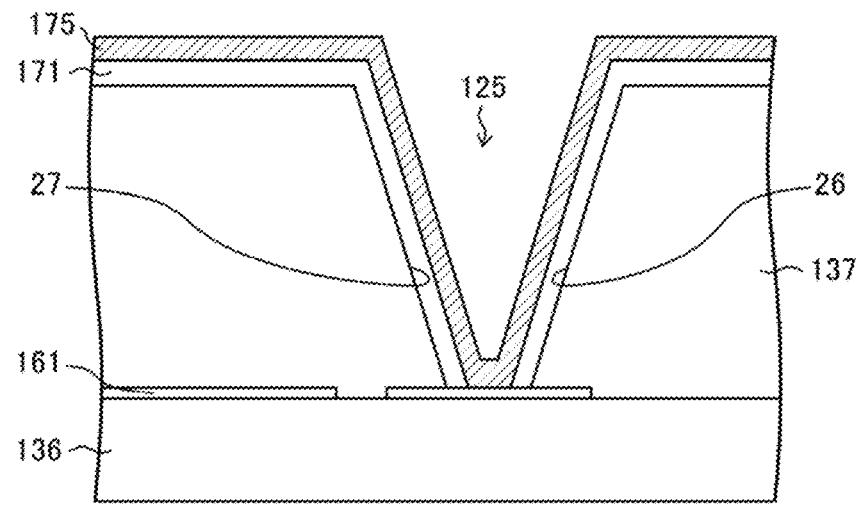
FIG. 17 is a cross-sectional view of the hole in accordance with the variation, taken along a line A-A illustrated in FIG. 16.

FIGS. 16 through 18 are each a view illustrating a variation of the hole 125. The hole 125 in accordance with the present variation can be arranged so that the longer side L1 (see FIG. 18) is perpendicular to the printing direction or the ink jet scanning direction (see FIG. 16). FIG. 17 is a cross-sectional view taken along a line A-A illustrated in FIG. 16. FIG. 18 is a cross-sectional view taken along a line B-B illustrated in FIG. 16.

As illustrated in FIGS. 17 and 18, even in a case where the hole 125 is arranged so that the longer side L1 is parallel to the printing direction or the ink jet scanning direction, the angle of the first taper 26, which is located on the side on which the ink flows into the hole 125, is shallower than the angle of a second taper 27, which is located on the side on which the ink is pushed out from the hole 125. The third tapers 30, which extend in the direction of the shorter side L2 that is perpendicular to a direction in which the ink flows, can be formed in a stepwise shape having a plurality of steps.

Figure 19:
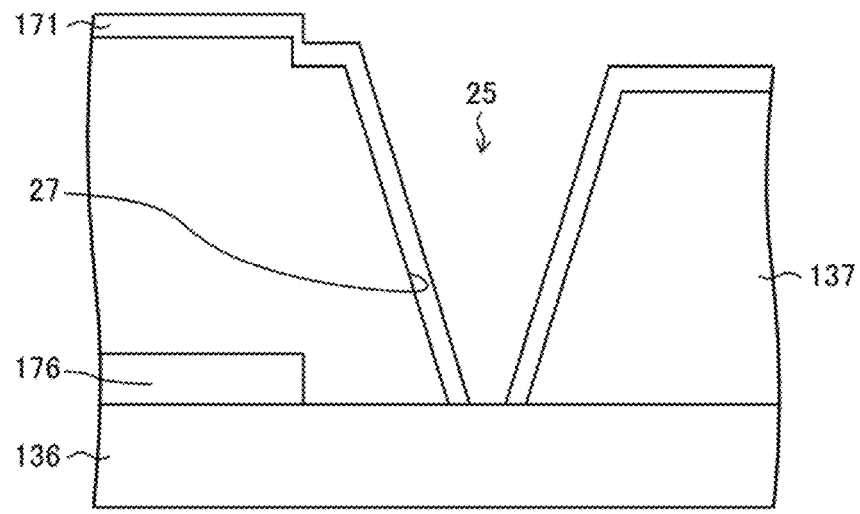
FIG. 19 is a cross-sectional view of a hole in accordance with a variation, the cross-sectional view illustrating a cross section obtained by cutting the hole in a direction parallel to a printing direction.
Figure 20:
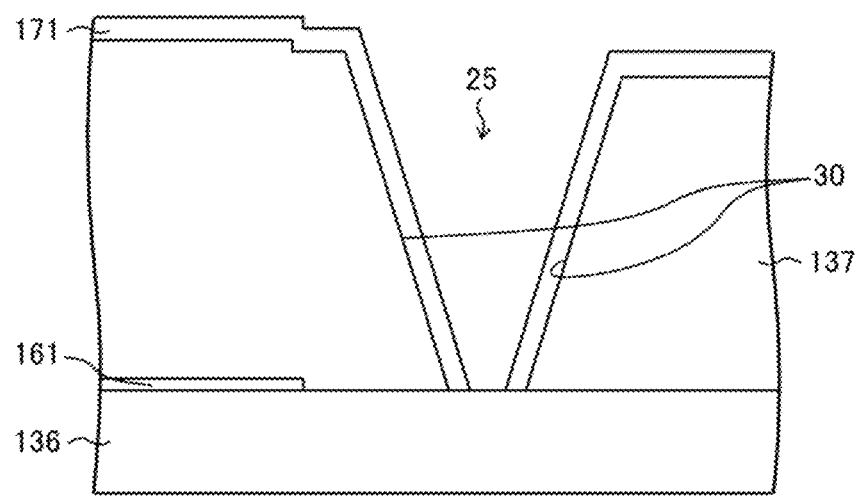
FIG. 20 is a cross-sectional view of the hole in accordance with the variation, the cross-sectional view illustrating a cross section obtained by cutting the hole 25 in a direction perpendicular to the printing direction.

FIGS. 19 and 20 are each a view illustrating variation of a hole 25, in which variation the hole 25 is formed in frame region 20 (not illustrated) that surrounds a pixel region 175 illustrated in FIG. 16. FIG. 19 is a cross-sectional view of the hole 25, which cross-sectional view is obtained by cutting the hole 25 in a direction parallel to the printing direction or the ink jet scanning direction. FIG. 20 is a cross-sectional view of the hole 25, which cross-sectional view is obtained by cutting the hole 25 in a direction perpendicular to the printing direction or the ink jet scanning direction.

As illustrated in FIGS. 19 and 20, in a case where the hole 25 is formed in the frame region 20 which surrounds the pixel region 175, a second taper 27 which is located on a side on which ink is pushed out from the hole 25 can be formed in a stepwise shape having a plurality of steps. Further, at least one of third tapers 30 which extend in a direction perpendicular to the direction in which the ink flows can be formed in a stepwise shape having a plurality of steps.

Embodiment 3

The following description will discuss Embodiment 3 of the present invention. Note that, for convenience, an identical reference numeral will be given to a member having a function identical to that of a member described in Embodiment 1, and description of the member will be omitted.

In Embodiment 1, an example has been described in which tapers each of which has a plurality of steps are formed by single exposure with use of a mask 50 having an opening 51 and slits 52, each of the opening 51 and the slits 52 having an exposure adjusting function. In Embodiment 3, a process for forming a hole 25, in which process tapers each of which has a plurality of steps are formed by carrying out exposure for each of the plurality of steps, will be described.

Figure 21A:
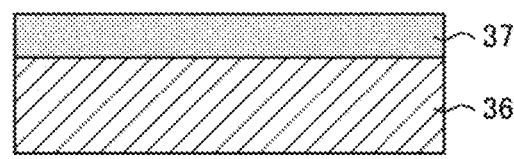
FIG. 21A is a view illustrating a respective step for forming a hole in accordance with Embodiment 3.
Figure 21B:
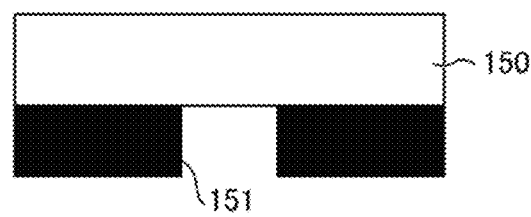
FIG. 21B is a view illustrating a respective step for forming a hole in accordance with Embodiment 3.
Figure 21C:
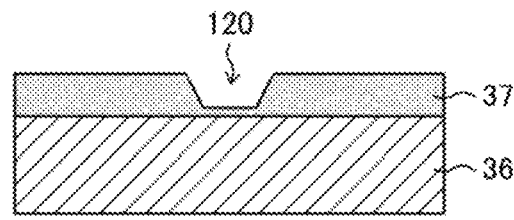
FIG. 21C is a view illustrating a respective step for forming a hole in accordance with Embodiment 3.
Figure 22A:
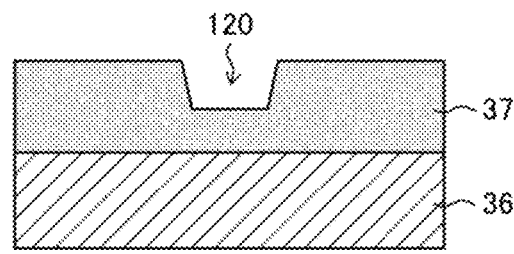
FIG. 22A is a view illustrating a respective step for forming a hole in accordance with Embodiment 3.
Figure 22B:
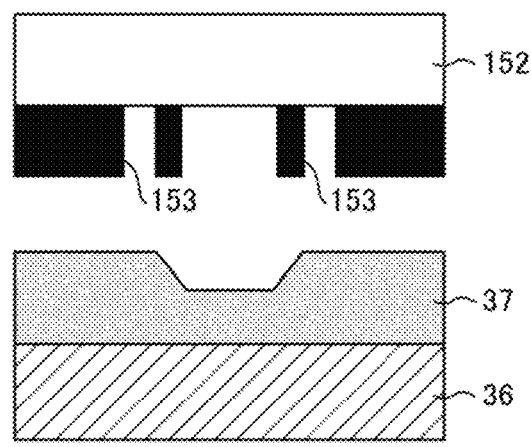
FIG. 22B is a view illustrating a respective step for forming a hole in accordance with Embodiment 3.
Figure 22C:
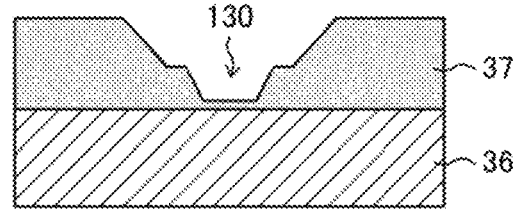
FIG. 22C is a view illustrating a respective step for forming a hole in accordance with Embodiment 3.

FIG. 21A through FIG. 21C and FIG. 22A through FIG. 22C are views schematically illustrating respective steps for forming the hole 25. FIG. 21A through FIG. 1C illustrate respective steps 1 through 3 for forming the hole 25. FIG. 22A through FIG. 22C illustrate respective steps 4 through 6 for forming the hole 25.

As illustrated in FIG. 21A, in a case where the hole 25 is formed, an insulating film material (for example, positive organic material) is applied to a base material 36 of a substrate 2 with use of a slit coater, and a solvent is dried by carrying out vacuum drying and prebaking so that a transparent interlayer insulating film 37 is formed. The transparent interlayer insulating film 37 can be caused to have a film thickness of, for example, 3 μm. (STEP 1)

Next, as illustrated in FIG. 21B, the transparent interlayer insulating film 37 is irradiated with i-line (365 nm) having energy of approximately 190 mJ through a mask 150. The mask 150 is, for example, a mask for exposure which has an opening 151 having a size of 5 μm×5 μm. The transparent interlayer insulating film 37 is thus exposed to the i-line in the form of the opening 151. (STEP As illustrated in FIG. 21C, the transparent interlayer insulating film 37 which has been exposed is developed with use of an alkaline solution, for example, TMAH (tetramethylammonium hydroxide). After development, the transparent interlayer insulating film is prebaked at 100° C. for 10 minutes, and is additionally heated at 220° C. for 40 minutes, so that a hole 120 corresponding to a shape of the opening 151 is formed in the transparent interlayer insulating film 37. (STEP 3)

Subsequently, as illustrated in FIG. 22A, a transparent interlayer insulating film material (negative organic material) is further applied, with use of a slit coater, to the transparent interlayer insulating film 37 in which the hole 120 is formed, and a solvent is dried by carrying out vacuum drying and prebaking so that a two-layered transparent interlayer insulating film 37 is formed. (STEP 4)

Next, as illustrated in FIG. 22B, the two-layered transparent interlayer insulating film 37 is irradiated with i-line (365 nm) having energy of approximately 400 mJ through a mask 152. The mask 152 can be a mask for exposure which has an opening that is greater in size than the opening 151 or can be alternatively a mask for exposure which has slits 152 each corresponding to a stepwise shape and located on respective both sides of an opening that is located at a middle part of the mask as illustrated in FIG. 7. (STEP 5)

As illustrated in FIG. 22C, the two-layered transparent interlayer insulating film 37, which has been exposed to the i-line having energy greater than that of the i-line at the first exposure, is developed with use of an alkaline solution, for example, TMAH (tetramethylammonium hydroxide). After development, the two-layered transparent interlayer insulating film 37 is prebaked at 100° C. for 10 minutes, and is additionally heated at 220° C. for 40 minutes, so that a hole 130 corresponding to a shape of the opening of the mask 152 is formed in the two-layered transparent interlayer insulating film 37. (STEP 6)

In this way, it is possible to form the tapers each of which has the plurality of steps, by repeating, the number of tunes corresponding to the number of steps, (i) an insulating film forming step of forming a transparent interlayer insulating film on a substrate and (ii) a hole forming step of forming a hole by (a) exposing, with use of a mask for exposure, the transparent interlayer insulating film formed in the insulating film forming step and (b) developing the transparent interlayer insulating film thus exposed (that is, by repeating STEPs 4 through 6).

Note that the mask 150 and the mask 152 can be each a mask having an opening which has an exposure adjusting function.

[Recap]

A display device (1) in accordance with Aspect 1 of the present invention is a display device (1) which is obtained by applying ink to a display region (10) of a substrate (2), the substrate (2) including at least one hole (25) which causes the ink to be drawn into the at least one hole (25), the at least one hole (25) having a third taper (30) which is formed in a stepwise shape having a plurality of steps and which extends in a direction perpendicular to a direction in which the ink flows into the at least one hole (25), an angle of a tangential line connecting respective vertices of the plurality of steps of the third taper (30) being shallower than (i) an angle of a first taper (26) which is located on a side of the at least one hole (25) on which side the ink flows into the at least one hole (25) and (ii) an angle of a second taper (27) which is located on a side of the at least one hole (25) on which side the ink is pushed out from the at least one hole (25).

According to the above configuration, it is possible to efficiently guide the ink to the at least one hole (25). This stabilizes a pattern of the ink applied to the display region (10), and reduces unevenness in thickness of the ink in the display region (10).

The display device (1) in accordance with Aspect 2 of the present invention can be arranged such that, in Aspect 1, the at least one hole (25) is formed so that the angle of the first taper (26) is shallower than the angle of the second taper (27).

The display device (1) in accordance with Aspect 3 of the present invention can be arranged such that, in Aspect 1 or 2, the at least one hole (25) is formed so that a shorter side (L2) of the at least one hole (25) is not more than 14 µm and a longer side (L1) of the at least one hole (25) is not more than 18 µm, the shorter side (L2) being parallel to the direction in which the ink flows into the at least one hole (25), the longer side (L1) being perpendicular to the direction in which the ink flows into the at least one hole (25).

The display device (1) in accordance with Aspect 4 of the present invention can be arranged such that, in any one of Aspects 1 through 3, the at least one hole (25) is arranged so that a direction of a longer side (L1) is parallel to an edge (11) of a pattern of the ink.

The display device (1) in accordance with Aspect 5 of the present invention can be arranged such that, in any one of Aspects 1 through 4, the at least one hole (25) includes a plurality of holes (25); and the plurality of holes are arranged around the display region (10).

The display device (1) in accordance with Aspect 6 of the present invention can be arranged such that, in Aspect 5, the plurality of holes (25) are arranged in a single row around the display region (10).

The display device (1) in accordance with Aspect 7 of the present invention can be arranged such that, in Aspect 5, the plurality of holes (25) are arranged in a plurality of rows around the display region (10); and adjacent rows of holes (25), out of the plurality of holes (25), are staggered.

The display device (1) in accordance with Aspect 8 of the present invention can be arranged such that, in any one of Aspects 4 through 7, the display region (10) has a curved part (13) which is curved as viewed from above.

The display device (1) in accordance with Aspect 9 of the present invention can be arranged such that, in any one of Aspects 4 through 7, the display region (10) has a corner (12); the at least one hole (25) includes a plurality of holes (25); and the plurality of holes (25) are arranged, around the corner (12), radially with respect to a tip of the corner (12).

The display device (1) in accordance with Aspects 10 of the present invention can be arranged such that, in any one of Aspects 1 through 3, the at least one hole (25) is arranged in a pixel in the display region (10) so that a longer side (L1) of the at least one hole (25) is perpendicular to a printing direction in which the ink is applied; and the at least one hole (25) includes (a) a pixel electrode (160) which is arranged along the third taper (30) and (b) a source metal (161) which is arranged on a bottom part (135) of the at least one hole (25).

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Display device
2 Substrate
10 Display region
11 Edge
12 Corner
13 Curved part
25, 125 Hole
26 First taper
27 Second taper
30 Third taper
37 Transparent interlayer insulating film
50, 150, 152 Mask
160 Pixel electrode
161 Source metal
L1 Longer side
L2 Shorter side

The invention claimed is:

1. A display device which is obtained by applying ink to a display region of a substrate,
   the substrate comprising at least one hole which causes the ink to be drawn into the at least one hole,
   the at least one hole having a third taper which is formed in a stepwise shape having a plurality of steps and which extends in a direction perpendicular to a direction in which the ink flows into the at least one hole,
   an angle of a tangential line connecting respective vertices of the plurality of steps of the third taper being shallower than (i) an angle of a first taper which is located on a side of the at least one hole on which side the ink flows into the at least one hole and (ii) an angle of a second taper which is located on a side of the at least one hole on which side the ink is pushed out from the at least one hole.

2. The display device as set forth in claim 1, wherein the at least one hole is formed so that the angle of the first taper is shallower than the angle of the second taper.

3. The display device as set forth in claim 1, wherein the at least one hole is formed so that a shorter side of the at least one hole is not more than 14 μm and a longer side of the at least one hole is not more than 18 μm, the shorter side being parallel to the direction in which the ink flows into the at least one hole, the longer side being perpendicular to the direction in which the ink flows into the at least one hole.

4. The display device as set forth in claim 1, wherein the at least one hole is arranged so that a direction in which the third taper extends is parallel to an edge of a pattern of the ink.

5. The display device as set forth in claim 1, wherein:
the at least one hole includes a plurality of holes; and
the plurality of holes are arranged around the display region.

6. The display device as set forth in claim 5, wherein the plurality of holes are arranged in a single row around the display region.

7. The display device as set forth in claim 5, wherein:
the plurality of holes are arranged in a plurality of rows around the display region; and
adjacent rows of holes, out of the plurality of holes, are staggered.

8. The display device as set forth in claim 1, wherein the display region has a curved part which is curved as viewed from above.

9. The display device as set forth in claim 1, wherein:
the display region has a corner;
the at least one hole includes a plurality of holes; and
the plurality of holes are arranged, around the corner, radially with respect to a tip of the corner.

10. The display device as set forth in claim 1, wherein:
the at least one hole is arranged in a pixel in the display region so that a longer side of the at least one hole is perpendicular to a printing direction in which the ink is applied, the longer side being a side along which the third taper extends; and
the at least one hole includes (a) a pixel electrode which is arranged along the third taper and (b) a source metal which is arranged on a bottom part of the at least one hole.

11. A method of producing a display device which is obtained by applying ink to a display region of a substrate, the method comprising:

an insulating film forming step of forming a transparent interlayer insulating film on the substrate; and a hole forming step of forming a hole, which causes the ink to be drawn into the hole, by exposing, with use of a mask for exposure, the transparent interlayer insulating film formed in the insulating film forming step and developing the transparent interlayer insulating film thus exposed, in the hole forming step, a third taper, which extends in a direction perpendicular to a direction in which the ink flows into the hole, being formed into a stepwise shape having a plurality of steps, and an angle of a tangential line connecting respective vertices of the plurality of steps of the third taper being made shallower than (i) an angle of a first taper which is located on a side of the hole on which side the ink flows into the hole and (ii) an angle of a second taper which is located on a side of the hole on which side the ink is pushed out from the hole.

12. The method as set forth in claim 11, wherein, in the hole forming step, the third taper is formed by (a) exposing the transparent interlayer insulating film with use of a mask for exposure which has a slit corresponding to the stepwise shape having the plurality of steps and (b) developing the transparent interlayer insulating film thus exposed.

13. The method as set forth in claim 11, wherein the third taper is formed into the stepwise shape having the plurality of steps by repeating the insulating film forming step and the hole forming step.

* * * * *